Patented Oct. 2, 1945

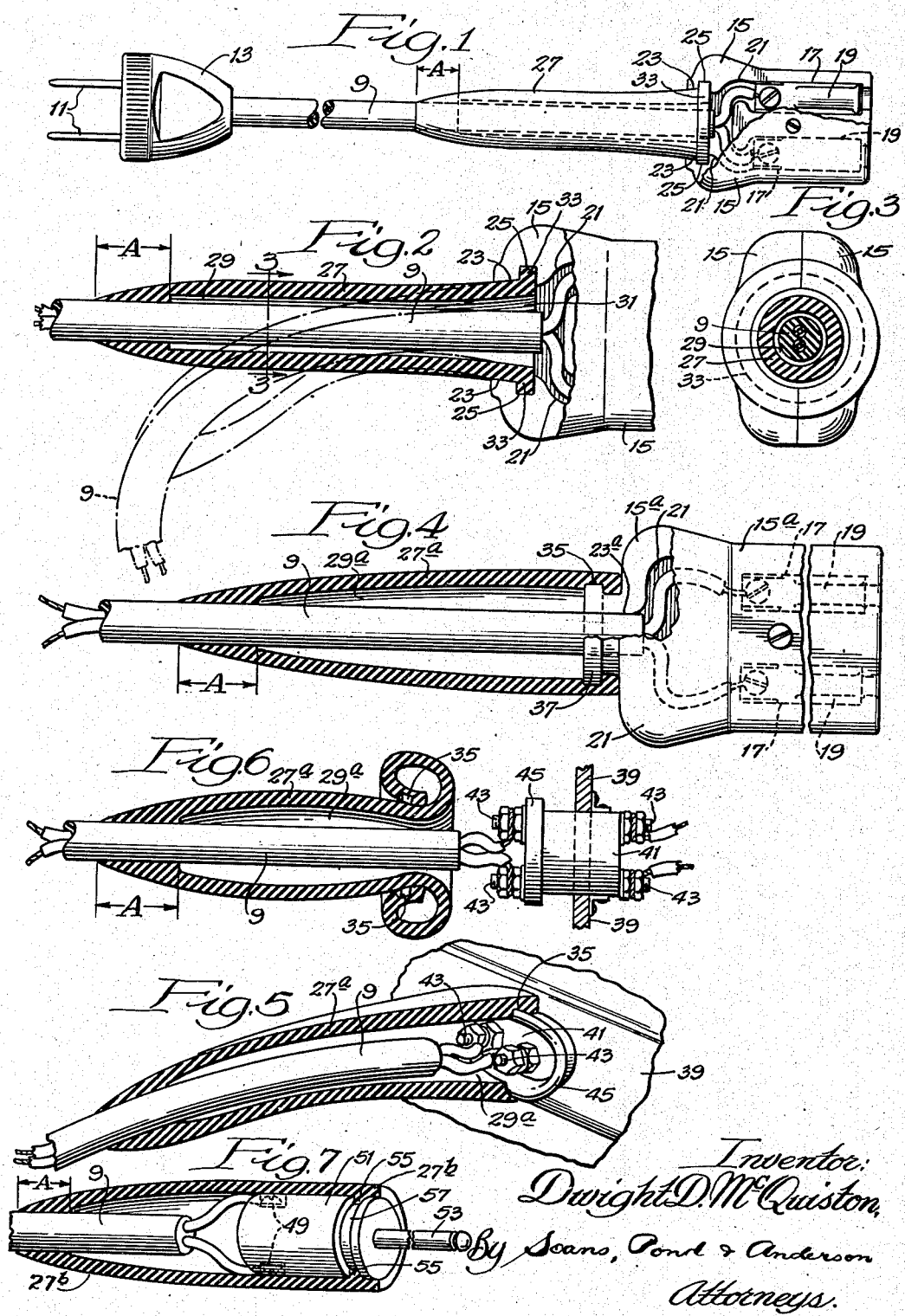

2,386,000

UNITED STATES PATENT OFFICE 2,386,000

MOLDED STRAIN RELIEF

Dwight D. McQuiston, Richmond, Ind., assignor to Belden Manufacturing Company, a corporation of Illinois Application June 27, 1941, Serial No. 399,997

2 Claims. (Cl. 173—322)

This invention relates to electrical connector cords of the general type used in conjunction with electrical appliances and similar apparatus, and has particular reference to the strain reliefs and protective devices which are frequently used with such cords.

It is well known in this art that most connector cord failures occur in that portion of the cord which is adjacent the appliance or terminal connector with which the cord is used. These failures apparently result from the severe bending and straining of the cord which normally occurs in this region, and much work has been done toward the provision of cord protective devices, designed to strengthen this portion of the cord against bending, and of cord strain relief devices, which relieve the strain on the adjacent electrical connections. The prior art devices have not, however, proven entirely satisfactory, and the principal object of the present invention is to provide an improved cord protective device which will materially strengthen that portion of the cord where most bending occurs and which may, at the same time, be used to accomplish a strain relief function.

A related object of the invention is to provide a cord protective device in accordance with the aforesaid principal object which shall be of attractive design, simple and easy to manufacture, and low in cost.

Other objects and the various novel features and advantages of the invention will be made more apparent by reference to the accompanying drawing and the following description of certain preferred embodiments thereof. In the drawing:

Fig. 1 is an elevational view, partially cut away, of an electrical conductor cord equipped with a combination cord reinforcement and strain relief in accordance with the present invention;

Fig. 2 is an enlarged sectional view of the combination strain relief and cord protector illustrated in Fig. 1;

Fig. 3 is a sectional view on the line 3—3 of Fig. 2;

Fig. 4 is a sectional view similar to Fig. 2, illustrating another embodiment of the invention;

Fig. 5 is a sectional view illustrating how the embodiment of Fig. 4 may be used in connection with electrical appliances of various types to provide a moisture and dust proof connection;

Fig. 6 is a fragmentary sectional view illustrating an intermediate step in the installation of the Fig. 5 embodiment; and Fig. 7 is a perspective view partly in section illustrating a third embodiment of the invention.

A flexible, insulated, duplex conductor cord of conventional type is illustrated at 9 in Fig. 1. The two metallic conductors of the cord 9 are connected at one end to the prong terminals 11 of a conventional plug connector 13 which is preferably, but not necessarily, provided with an unbreakable, molded rubber body. The prong terminals 11 of the plug 13 are designed to engage and connect with the terminals of a conventional outlet. In the particular embodiment of the invention illustrated in Figs. 1, 2, and 3, the individual cord connectors are connected at the other end of the cord to an appliance connector similar to that illustrated in Patent 2,178,621 to Andre. This connector includes a pair of cooperating half sections 15, of rigid insulating material, which cooperate to form the connector body and which are provided with suitably opposed recesses which define, in the assembled connector passageways 17 for supporting two, female, terminal connectors 19, curved passageways 21 for receiving the individual cord conductors, and a central passageway 23 for admitting the cord 9 to the interior of the connector body. This central passageway 23 is provided with an enlarged annular portion 25 which in the prior art construction, serves to engage and support the metallic spring previously used in connection with these devices.

The combination cord protector and strain relief embodied into the structure illustrated in Figs. 1, 2, and 3 comprises a thin walled, generally bell shaped, sleeve member 27 of resilient material disposed about and integrally attached to the cord 9 adjacent the end thereof. The sleeve member 27 is attached to the cord 9 along only a small portion of the length of the sleeve, the portion A in Figs. 1 and 2, and the remainder of the sleeve is laterally spaced from and freely movable relative to the cord. This partial connection of the sleeve to the cord adds greatly to the effectiveness of the device as a cord protector and is an important feature of the invention. For best results the length of the portion A should be as short as possible consistent with a good mechanical connection between the conductor cord 9 and the sleeve member 27.

The cross sectional area of the central passageway 29 within the sleeve member 27 preferably should be somewhat greater than the cross sectional area of the cord 9 which is disposed therein, and it is desirable to flare the open end of the sleeve as illustrated at 31 in Fig. 2. The sleeve member 27 is preferably made of a suitable, resilient, rubber compound and may be most conveniently manufactured by molding it directly onto the cord. Other forms of integral attachment are, however, within the contemplation of the invention, and the terms "rubber" or "rubber compound" as used herein are intended to include the various types of natural or synthetic rubber or rubber base insulating compounds or their equivalent. The sleeve 24, because of its shape and mode of attachment to the cord with which it is used, can be readily flexed in a transverse direction, thereby providing adequate protection to the terminal portion of the cord against the banding stresses to which that portion of the cord is subjected. At the same time, the sleeve 24 is only slightly extensible in a longitudinal direction, which characteristic makes possible a highly effective strain relief. The flexibility and strength characteristics of the sleeve member 27 can be conveniently controlled to satisfy any particular requirement by appropriate correlation of the dimensions of the member and by selection of an appropriate molding compound.

The sleeve member 27 is provided at its open end with an annular enlargement 33 which is adapted to engage the annular recess 25 formed in the assembled halves 15 of the connector body to provide a mechanical connection between the sleeve member 27 (and the cord 9 which is integrally attached to the sleeve) and the connector body. By virtue of this mechanical connection and the peculiar shape of the sleeve member 27, the sleeve member accomplishes a strain function in addition to its cord reinforcing function. It also protects the portion of the cord which it surrounds from dust and moisture. The limiting of the attachment between the bell-shaped member sleeve 27 and the cord 9 to only a portion of the sleeve prevents the creation of any localized strains in the cord or sleeve when the cord is stressed or bent during use. At the same time the thin walled construction, the shape, and the mode of attachment of the sleeve member 27 permit easy bending of the cord, without loss of the desired strain relief function resulting from the longitudinal inextensibility of the sleeve.

For certain installations it may be found desirable to utilize a sleeve member having the form illustrated at 27ª in Figs. 4, 5, and 6. The principal difference between the sleeve member 27ª and the sleeve member 27 previously described is in the provision of an annular recess 35 inside the open end of the sleeve 27ª for interfitting with and mechanically connecting to the apparatus with which the device is attached. The sleeve 27 utilizes an annular enlargement or rib 33 for accomplishing this connection.

When an imperforate sleeve member such as 27ª is to be used in connection with a rigid body connector of the general type previously described, each of the two cooperating halves 15ª of the connector body should be provided with cooperating annularly grooved extensions 37, preferably but not necessarily semi-circular in cross section for engagement with the annular recess 35 in the open end of the combination cord protector and strain relief as illustrated in Fig. 4. When this latter form of the sleeve member of the present invention is used in connection with a connector body as just described, the sleeve member accomplishes the further desirable function of effectively sealing the end of the connector body against dust and moisture. At the same time it aids in holding the two halves of the connector body together and it gives a finished appearance to the entire assembly.

This latter form of the cord protector and strain relief of the present invention also finds use in connection with other types of apparatus where a streamlined finished appearance of a moisture and dust-proof connection is desired. In Figs. 5 and 6 there is illustrated, at 39, a portion of the frame of an electrical appliance which might be a washing machine, a portable tool, a waffle iron or other device. Supported upon this frame is an insulating terminal block 41 of any suitable type which, in turn, supports the electrical terminals 43 of the device. At its outer end, the terminal block 41 is provided with a rib 45 for mechanically engaging and interfitting with the annular groove 35 in the open end of the sleeve member 27ª. In making the electrical connections between the cord conductors and the terminals 43, it will be found advantageous to roll back the end of the sleeve member as illustrated in Fig. 6. The cord conductors may then be readily connected to the appliance terminals, following which operation the sleeve 27ª may be unrolled and slipped over the connection rib 45 in such manner that the annular groove 35 formed in the end of the sleeve member 27ª will engage with the rib 45 or other cooperating part. This arrangement provides a very neat appearing connection which is substantially water and dust-proof. When used in connection with a heating appliance, the arrangement has also been found to run very cool, apparently due, in part, to the air space provided at 29ª between the cord and the sleeve body.

The combination strain relief and cord protecting sleeve of the present invention is also adapted for use in connection with male plug connectors, and an embodiment of the invention as applied to such a connector is illustrated in Fig. 7. The flexible insulated cord 9 in this embodiment of the invention is of conventional duplex type, although a single conductor cord or a cord having more than two conductors can be used. The two cord conductors are connected by screws or other means to terminals 49 supported on a generally cylindrical body 51 of rigid, insulating material. The terminals 49 are connected, within the body 51, to the tip and barrel of a conventional plug contact 53, as in the structure illustrated, or to two spaced prongs similar to the prongs 11 of Fig. 1.

The sleeve member 27ᵇ used in this embodiment of the invention is quite similar to the sleeve member 27ª except that an annular rib 55 is provided in place of the annular recess 35 in the 27ª member. This rib 55 is adapted to engage and interfit with a cooperating annular recess 57 formed in the contact supporting body 51, and to assure a good mechanical connection it is desirable that the sleeve member 27ᵇ shall tightly grip the contact supporting body 51. The sleeve member 27ᵇ is attached to the cord 9 only along the portion A, and is otherwise movable relative to the cord 9.

In the foregoing, I have disclosed three particularly satisfactory embodiments of my invention. It will be understood, however, that devices of other forms can be worked out without departure from the principles which have been disclosed in the foregoing. Accordingly, it is my desire that the accompanying claims shall be accorded the broadest reasonable construction consistent with the language appearing therein and the prior art.

I claim as my invention:

1. In combination, a flexible, insulated, conductor cord, and a sleeve member of resilient material disposed about said cord, one end of said sleeve being integrally attached to said cord along a portion of the length of said sleeve, the remainder of said sleeve being unattached to said cord and being movable relative thereto, the length of said sleeve being a plurality of times that of its diameter and the walls of said sleeve member being so proportioned that said member is transversely flexible but is only slightly extensible longitudinally, said sleeve member, at its end which is not attached to said cord, being provided with means for attaching it to the apparatus with which said cord is used to provide a resilient strain relief and reinforcement for said cord.

2. In combination, an electrical appliance, a flexible, insulated, conductor cord electrically connected to the terminals of said appliance, a thin walled, bell-shaped, sleeve member of resilient material molded onto said cord, the thickness and proportions of said sleeve member being such that said member is transversely flexible but is only slightly extensible longitudinally, the inwardly flaring end of said bell-shaped sleeve member being attached to said cord and the passageway within the remainder of said sleeve member being of substantially greater cross sectional area than said cord to permit free relative movement between the unattached portion of said sleeve and said cord, the outwardly flaring open end of said bell-shaped sleeve member and said appliance having interengageable parts whereby said sleeve may be mechanically connected to said appliance to provide a resilient strain relief and reinforcement for said cord.

DWIGHT D. McQUISTON.